US012657253B2

(12) United States Patent
Procopio et al.

(10) Patent No.: US 12,657,253 B2
(45) Date of Patent: Jun. 16, 2026

(54) AUTOMATIC GENERATION OF NO-CODE EMBEDDED DATA-DRIVEN APPLICATION VIEWS

(71) Applicant: Google LLC, Mountain View, CA (US)

(72) Inventors: Michael Jeffrey Procopio, Boulder, CO (US); Rachel Goodman Moore, Kirkland, WA (US); Sarmad Hashmi, San Jose, CA (US); Nicholas Eric Westbury, Seattle, WA (US); Francis Herrera Cortez, San Bruno, CA (US)

(73) Assignee: Google LLC, Mountain View, CA (US)

( * ) Notice: Subject to any disclaimer, the term of this patent is extended or adjusted under 35 U.S.C. 154(b) by 43 days.

(21) Appl. No.: 18/453,413

(22) Filed: Aug. 22, 2023

(65) Prior Publication Data

US 2025/0068396 A1 Feb. 27, 2025

(51) Int. Cl.
*G06F 8/34* (2018.01)
*G06F 9/451* (2018.01)
(Continued)

(52) U.S. Cl.
CPC .............. *G06F 16/958* (2019.01); *G06F 8/34* (2013.01); *G06F 9/451* (2018.02);
(Continued)

(58) Field of Classification Search
CPC ........ G06Q 50/01; F24F 11/52; H04W 12/35; H04L 67/04; G06F 9/451; G06F 16/958
See application file for complete search history.

(56) References Cited

U.S. PATENT DOCUMENTS 10,466,981 B1    11/2019  MacMillan et al.
10,656,907 B2    5/2020   Seolas
(Continued)

FOREIGN PATENT DOCUMENTS

CN        108090035 A      5/2018

OTHER PUBLICATIONS

ElBatanony, Ahmed, and Giancarlo Succi. "Towards the no-code era: a vision and plan for the future of software development." Proceedings of the 1st ACM SIGPLAN International Workshop on Beyond Code: No Code. 2021. (Year: 2021).
(Continued)

*Primary Examiner* — Tuan A Vu
(74) *Attorney, Agent, or Firm* — Shumaker & Sieffert, P.A.

(57) ABSTRACT

A method includes receiving, from a user, an embedded application view request requesting embedding of an application view within a host container. The application view is derived from a no-code application, and the no-code application is generated using a no-code application development environment. The embedded application view request includes a uniform resource locator (URL) referencing the no-code application and a data record of a dataset associated with the no-code application. The method includes obtaining credentials associated with the user and determining, using the credentials, that the user has access to the data record of the dataset. The method also includes, after determining that the user has access to the data record of the dataset, rendering, within the host container at an anchor location, an embedded application view based on the data record of the dataset.

18 Claims, 10 Drawing Sheets

(51) Int. Cl.

| | | |
|---|---|---|
| *G06F 16/958* | (2019.01) | |
| *G06F 21/62* | (2013.01) | |
| *F24F 11/52* | (2018.01) | |
| *G06Q 10/40* | (2026.01) | |
| *H04L 67/04* | (2022.01) | |
| *H04W 12/30* | (2021.01) | |

(52) U.S. Cl.
CPC .......... *G06F 21/6218* (2013.01); *F24F 11/52* (2018.01); *G06Q 10/40* (2026.01); *H04L 67/04* (2013.01); *H04W 12/35* (2021.01)

(56) References Cited

U.S. PATENT DOCUMENTS

| | | | |
|---|---|---|---|
| 11,163,960 | B2 | 11/2021 | Saha et al. |
| 11,381,666 | B1 | 7/2022 | Stalioraitis et al. |
| 11,870,741 | B2 | 1/2024 | John et al. |
| 11,922,143 | B1 | 3/2024 | Shapiro et al. |
| 12,079,584 | B2 | 9/2024 | Dua et al. |
| 2003/0115142 | A1 | 6/2003 | Brickell et al. |
| 2005/0102534 | A1 | 5/2005 | Wong |
| 2006/0248406 | A1 | 11/2006 | Qing et al. |
| 2008/0040681 | A1* | 2/2008 | Synstelien ............. G06F 9/451 |
| | | | 715/765 |
| 2008/0052348 | A1* | 2/2008 | Adler ...................... H04L 67/04 |
| | | | 709/217 |
| 2013/0024808 | A1 | 1/2013 | Rainisto |
| 2014/0067702 | A1* | 3/2014 | Rathod .................. G06Q 10/40 |
| | | | 705/319 |
| 2016/0210361 | A1 | 7/2016 | Pistoia et al. |
| 2016/0321222 | A1 | 11/2016 | Greenberg |
| 2016/0357373 | A1 | 12/2016 | Greenberg et al. |
| 2018/0024814 | A1 | 1/2018 | Ouali |
| 2018/0054464 | A1 | 2/2018 | Zhang et al. |
| 2018/0107461 | A1 | 4/2018 | Balasubramanian et al. |
| 2018/0219921 | A1 | 8/2018 | Baer et al. |
| 2018/0285084 | A1 | 10/2018 | Mimlitch, III et al. |
| 2019/0073197 | A1 | 3/2019 | Collins |
| 2019/0268178 | A1 | 8/2019 | Fairweather et al. |
| 2019/0391823 | A1 | 12/2019 | Jouhier |
| 2019/0394150 | A1 | 12/2019 | Denoue et al. |
| 2020/0153750 | A1* | 5/2020 | Petys ................... H04W 12/35 |
| 2020/0272114 | A1* | 8/2020 | Grabowski .............. F24F 11/52 |
| 2020/0301678 | A1 | 9/2020 | Burman |
| 2020/0374244 | A1 | 11/2020 | John |
| 2021/0042094 | A1 | 2/2021 | Burman |
| 2021/0044546 | A1 | 2/2021 | Taslimi et al. |
| 2021/0064349 | A1 | 3/2021 | Allgeier et al. |
| 2021/0064685 | A1 | 3/2021 | Weizman et al. |
| 2021/0089618 | A1 | 3/2021 | Jain et al. |
| 2021/0141616 | A1 | 5/2021 | Kane |
| 2021/0141617 | A1 | 5/2021 | Burman et al. |
| 2021/0337249 | A1 | 10/2021 | Jain |
| 2022/0060435 | A1 | 2/2022 | Whitten et al. |
| 2022/0129257 | A1 | 4/2022 | Touati et al. |
| 2022/0244925 | A1 | 8/2022 | Moss et al. |
| 2022/0366147 | A1 | 11/2022 | Ho |
| 2022/0374209 | A1 | 11/2022 | Shek et al. |
| 2022/0405068 | A1 | 12/2022 | Brown |
| 2023/0107316 | A1 | 4/2023 | Ripa et al. |
| 2023/0110941 | A1 | 4/2023 | Makhija et al. |
| 2023/0125807 | A1 | 4/2023 | Ripa et al. |
| 2023/0185544 | A1 | 6/2023 | Procopia et al. |
| 2023/0334395 | A1 | 10/2023 | Gorroño et al. |
| 2023/0393832 | A1 | 12/2023 | Touati et al. |
| 2024/0111504 | A1 | 4/2024 | Procopia et al. |
| 2024/0231766 | A1 | 7/2024 | Ferreira et al. |
| 2024/0256784 | A1 | 8/2024 | Harris et al. |
| 2024/0272877 | A1 | 8/2024 | Girdhar |
| 2024/0370234 | A1 | 11/2024 | Procopio et al. |
| 2024/0412157 | A1 | 12/2024 | Manzano et al. |

OTHER PUBLICATIONS

Google for Developers, "Authenticate as a Google Chat app", Oct. 2022, 7 pp.
Google for Developers, "Build an HTTP Google Chat app", Oct. 2022, 6 pp.
Sahay, Apurvanand, et al. "Supporting the understanding and comparison of low-code development platforms." 2020 46th Euromicro Conference on Software Engineering and Advanced Applications (SEAA). IEEE, 2020. (Year: 2020).
U.S. Appl. No. 18/628,375, filed Apr. 5, 2024, naming inventors Procopio et al.
Weber, Irene. "Low-code from frontend to backend: Connecting conversational user interfaces to backend services via a low-code IoT platform." Proceedings of the 3rd Conference on Conversational User Interfaces. 2021. (Year: 2021).
Lugovsky, "*Low Code* vs *No Code*: Full Analysis 2025", UI Bakery, Inc., Aug. 14, 2023, 15 pp.
Talesra et al., "Low-Code Platform for Application Development", International Journal of Applied Engineering Research, vol. 16, No. 5, May 31, 2021, 6 pp.
"AppSheet—Wikipedia", Wikipedia, 2023, 5 pp., Retrieved from the Internet on Nov. 17, 2025 URL: https://en.wikipedia.org/w/index.php?title=AppSheet&oldid=1163700647.
"Run your app in an iFrame on a web page—AppSheet Help", Google, 2022, 1 pp., Retrieved from the Internet on Nov. 17, 2025 from URL: https://web.archive.org/web/20220528202500/support.google.com/appsheet/answer/10104491.
"Send an email from an automation—AppSheet Help", Google, 2022, 10 pp., Retrieved from the Internet on Nov. 17, 2025 from URL: https://web.archive.org/web/20221104135615/https://support.google.com/appsheet/answer/11447614.
International Search Report and Written Opinion of International Application No. PCT/US2024/043117 dated Dec. 5, 2024, 11 pp.
Matt, "How To Create A Clickable Link To A Specific Record (for an AppSheet app)", MultiTech Visions, Mar. 16, 2023, 7 pp., Retrieved from the Internet on Nov. 24, 2025 from URL: https://www.multitechvisions.com/post/how-to-create-a-clickable-link-to-a-specific-record-for-an-appsheet-app.
Gwendal et al., "Xatkit: a multimodal low-code chatbot development framework", IEEE Access, vol. 8, Jan. 27, 2020, 15 pp.

\* cited by examiner

AUTOMATIC GENERATION OF NO-CODE EMBEDDED DATA-DRIVEN APPLICATION VIEWS

TECHNICAL FIELD

This disclosure relates to automatic generation of no-code embedded data-driven application views.

BACKGROUND

No-code development platforms allow programmers and non-programmers to create application software via graphical user interfaces as opposed to conventional programming techniques. Thus, no-code platforms enable business technologists and citizen developers of all skill levels to build power applications and workflows for their organizations without the need to write any code.

SUMMARY

One aspect of the disclosure provides a method for automatic generation of no-code embedded data-driven application views. The operations include receiving, from a user, an embedded application view request requesting an embedding of an application view within a host container. The application view is derived from a no-code application, and the no-code application is generated using a no-code application development environment. The embedded application view request may include a uniform resource locator (URL) referencing the no-code application and a data record of a dataset associated with the no-code application. The operations also include obtaining credentials associated with the user. The operations also include determining, using the credentials, that the user has access to the data record of the dataset. The operations include, after determining that the user has access to the data record of the dataset, rendering, within the host container at an anchor location, an embedded application view based on the data record of the dataset.

Implementations of the disclosure may include one or more of the following optional features. In some implementations, the host container may include a document editor. In some implementations, the operations further include, after embedding the application view, receiving, from the user, a user interaction indication indicating interaction, via a graphical user interface (GUI), with the embedded application view, and in response to receiving the user interaction indication, retrieving the data record of the dataset and rendering an expanded application view at the anchor location in place of the embedded application view. The expanded application view displays the retrieved data record at the GUI. In some of these implementations, the operations further include, receiving, from the user, a second user interaction indication indicating interaction, via the GUI, with the expanded application view, and, based on the second user interaction indication, updating the data record of the dataset or adding a new data record to the dataset. In some of these implementations, the operations further include updating the expanded application view based on the updated data record of the dataset or the new data record of the dataset. Optionally, the operations further include receiving, from the user, a second user interaction indication indicating interaction, via the GUI, with the expanded application view; and, in response to receiving the second user interaction indication, executing a script defined by the no-code application; sending an email; or sending a chat message. In at least a portion of these implementations, the operations further include receiving, from the user, a second user interaction indication, and, in response to receiving the second user interaction indication, rendering the embedded application view in place of the expanded application view.

In some examples, the operations further include receiving, from a second user, a second embedded application view request requesting embedding of the application view within the host container; obtaining second credentials associated with the second user; determining, using the second credentials, that the second user does not have access to the data record of the dataset; and, after determining that the second user does not have access to the data record of the dataset, rendering, within the host container at a second anchor location, a second embedded application view indicating that the second user does not have access to the data record of the dataset. The operations may further include, prior to receiving the embedded application view request, generating the URL based on a user interaction indication indicating interaction, via a GUI, with the host container. In some implementations, the operations further include receiving, from a second user, a second embedded application view request requesting embedding of the application view within the host container and rendering, within the host container at a second anchor location, a second embedded application view based on the dataset. The second embedded application view request may include a second URL referencing the no-code application and the dataset associated with the no-code application.

Another aspect of the disclosure provides a system for automatic generation of no-code embedded data-driven application views. The system includes data processing hardware and memory hardware in communication with the data processing hardware. The memory hardware stores instructions that when executed on the data processing hardware cause the data processing hardware to perform operations. The operations include receiving, from a user, an embedded application view request requesting an embedding of an application view within a host container. The application view is derived from a no-code application, and the no-code application is generated using a no-code application development environment. The embedded application view request may include a uniform resource locator (URL) referencing the no-code application and a data record of a dataset associated with the no-code application. The operations also include obtaining credentials associated with the user. The operations also include determining, using the credentials, that the user has access to the data record of the dataset. The operations include, after determining that the user has access to the data record of the dataset, rendering, within the host container at an anchor location, an embedded application view based on the data record of the dataset.

This aspect may include one or more of the following optional features. In some implementations, the host container may include a document editor. In some implementations, the operations further include, after embedding the application view, receiving, from the user, a user interaction indication indicating interaction, via a graphical user interface (GUI), with the embedded application view, and in response to receiving the user interaction indication, retrieving the data record of the dataset and rendering an expanded application view at the anchor location in place of the embedded application view. The expanded application view displays the retrieved data record at the GUI. In some of these implementations, the operations further include, receiving, from the user, a second user interaction indication indicating interaction, via the GUI, with the expanded application view, and, based on the second user interaction indication, updating the data record of the dataset or adding a new data record to the dataset. In some of these implementations, the operations further include updating the expanded application view based on the updated data record of the dataset or the new data record of the dataset. Optionally, the operations further include receiving, from the user, a second user interaction indication indicating interaction, via the GUI, with the expanded application view; and, in response to receiving the second user interaction indication, executing a script defined by the no-code application; sending an email; or sending a chat message. In at least a portion of these implementations, the operations further include receiving, from the user, a second user interaction indication, and, in response to receiving the second user interaction indication, rendering the embedded application view in place of the expanded application view.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

It is common for developers and other users to be required to use multiple different software as a service (SaaS) tools and/or multiple different collaboration platforms as the users move through their daily responsibilities. For example, users often must take actions across multiple tools to accomplish a task end-to-end. Because of product boundaries and technical limitations, data often cannot coexist across all of these tools or systems. As such, users are forced to maintain multiple systems for records and to manually link data together via inefficient and risky workarounds (e.g., copy and pasting, screenshots, etc.). This, combined with the frequent context switching (i.e., the switching of attention between different applications or tools), greatly decreases efficiency and productivity.

No-code development platforms allow programmers and non-programmers to create application software via graphical user interfaces as opposed to conventional programming techniques. Thus, no-code platforms enable business technologists and citizen developers of all skill levels to build power applications and workflows for their organizations without the need to write any code. Combining no-code development platforms with chat applications democratizes the chat application creation process so that anyone, in any role, has the skill needed to set up a chat application.

Implementations herein include systems and methods that provide application creators the ability to publish and deploy no-code applications that allow end users to interact with dynamic data visualization within a host container (e.g., an editor, such as a document editor). The implementations include an application controller that receives requests from an end user interacting with a host container front end (e.g., a graphical user interface (GUI) of a document editor). The request is associated with a no-code application and an underlying data record and/or dataset of the no-code application. The application controller responds by rendering within the host container, an embedded application view based on the data record and/or dataset.

Figure 1:
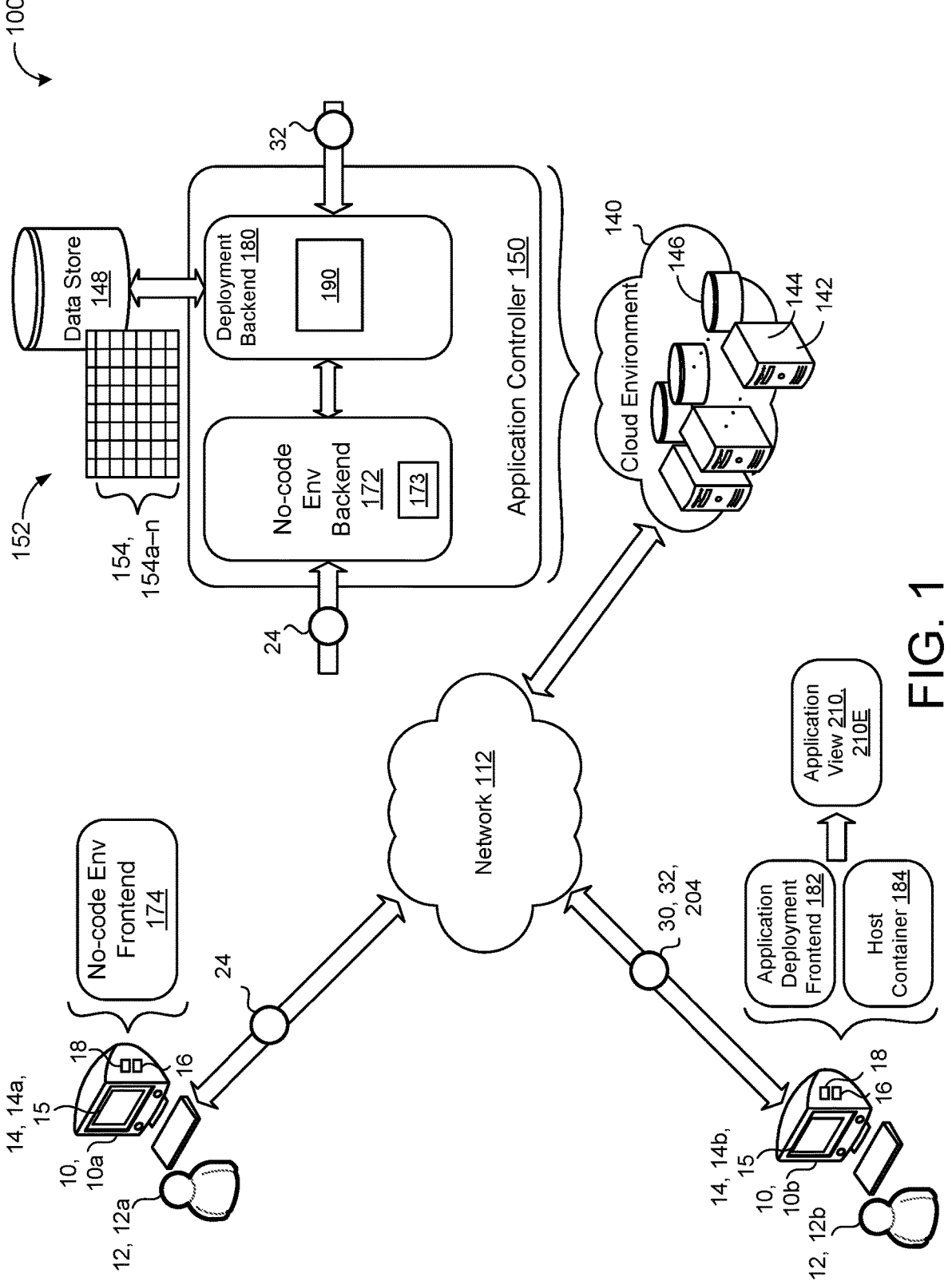
FIG. 1 is a schematic view of an example system for automatic generation of no-code embedded data-driven application views.

Referring to FIG. 1, in some implementations, an embedded application view system 100 includes a remote system 140 in communication with one or more user devices 10 each associated with a respective user 12 via a network 112. The remote system 140 may be a single computer, multiple computers, or a distributed system (e.g., a cloud environment) having scalable/elastic resources 142 including computing resources 144 (e.g., data processing hardware) and/or storage resources 146 (e.g., memory hardware). A data store 148 (i.e., a remote storage device) may be overlain on the storage resources 146 to allow scalable use of the storage resources 146 by one or more of the clients (e.g., the user device 10) or the computing resources 144.

The remote system 140 is configured to communicate with the user devices 10 via, for example, the network 112. The user device(s) 10 may correspond to any computing device, such as a desktop workstation, a laptop workstation, or a mobile device (i.e., a smart phone). Each user device 10 includes computing resources 18 (e.g., data processing hardware) and/or storage resources 16 (e.g., memory hardware). The data processing hardware 18 executes a GUI 14 for display on a screen 15 in communication with the data processing hardware 18.

The remote system 140 executes an application controller 150. The application controller 150 includes a no-code environment backend 172 (e.g., a no-code application development environment). A first user 12, 12a may communicate with the no-code environment backend 172 via, for example, a first user device 10, 10a and a no-code environment frontend 174 provided by the no-code environment backend 172. For example, the user 12a interacts with the no-code environment frontend 174 using a first GUI 14, 14a displayed on the screen 15. The combination of the no-code environment backend 172 and the no-code environment frontend 174 comprise a no-code environment. As discussed in more detail below, the GUI 14a provided by the no-code environment backend 172 may be a web-based GUI 14 (e.g., accessed via a web browser) and provides the user 12a with an interactive, visual workspace to build, execute, and publish no-code applications 190. In other examples, the no-code environment frontend 174 is executed by an application executing on the first user device 10a. The GUI 14a, for example, allows the user 12a to drag and drop application routines or subroutines into an editing area where they may be connected to form an application 190. Notably, the user 12 does not require programming skills to generate the application 190. For example, the user 12a selects one or more trigger conditions such as a modification to a data repository (e.g., a row of a table or a database being added, updated, or removed) and automations or actions or action responses (e.g., sending a notification, sending an email, executing a script, sending a chat message, etc.) that the application 190 executes in response to a trigger condition being satisfied. The application 190 may interact with data stored at an underlying data source. In some examples, the data store 148 acts as the underlying data source for the application 190. The application 190 may monitor for changes within data stored at the data store 148 for the trigger condition and/or modify data stored at the data store 148 for the action response. The user 12a may select one or more data sources for the application 190. For example, the user 12a directs the application controller 150 to one or more data elements (e.g., tables, databases, etc.) stored at the data store 148 when generating the application 190. The application 190 may support many different use cases, such as email automation (e.g., sending customized messages to internal or external users), creating invoices/decks/reports (e.g., generating files at a specified location using templated content), connecting services (e.g., send/return data from external services), and/or scheduling automated data manipulation/logic (e.g., run advanced business logic on data).

In some implementations, during or after the user 12a configures the application 190 (e.g., sets one or more trigger conditions and one or more action responses), the user 12a may publish and/or deploy the application 190 using the application deployment backend 180 via a deployment request 24. For example, the user 12a, selects deployment or publishing options, causing the application controller 150 to deploy the application 190, exposing the application 190 to end users 12 (i.e., to install and/or integrate into other applications).

The application deployment backend 180 may execute the application 190 and expose the application 190 via an application deployment frontend 182 to a second user 12, 12b. The combination of the application deployment backend 180 and the application deployment frontend 182 together provide an application environment. The second user 12b may be the same or different from the first user 12a. That is, the application controller 150 may deploy the application 190 for a user 12 that is different from the user 12 that authored the application 190. The second user 12b, for example, interacts with the application 190 via a second GUI 14, 14b executing on a second user device 10, 10b. The second GUI 14b allows the second user 12b to interact with the application deployment frontend 182 to, for example, view and/or edit data stored at the data store 148. The application deployment frontend 182 may execute on the second user device 10b, the first user device 10a, another user device (not shown), the remote system 140, or any combination thereof.

The user 12b may interact with the application 190 via a host container 184 or host application or host platform. For example, the host container 184 is a document editor that allows the user 12b to view and edit documents. In this example, the user device 10b may render views of the application 190 within the document editor such that the user 12b may interact with the application 190 while using the document editor. In other examples, the host container is a presentation program, an email client, or any other application that allows users to view and/or edit data. The host container 184 may execute locally on the user device 10 or remotely (e.g., on the remote system 140) and be accessed by the user device 10 via the network 112.

In some implementations, the host container 184 and the application deployment frontend 182 are the same application. In other implementations, the host container 184 and the application deployment frontend 182 are different applications. Optionally, the application deployment frontend 182 is an add-on or extension of the host container 184. For example, the user 12b installs or adds the application deployment frontend 182 to the host container 184 (e.g., via an application repository or the like).

The application controller 150, after the application 190 has been deployed, receives an embedded application view request 30 from the second user 12b via interaction with the application deployment frontend 182. The embedded application view request 30 includes a request for the application controller 150 to embed an application view 210 within the host container 184. The application view 210 is derived from the no-code application 190 generated using the no-code application development environment.

In some examples, the embedded application view request 30 includes a uniform resource locator (URL) 204 referencing the no-code application 190 and one or more data records 154, 154a-n of a dataset 152 associated with the no-code application 190. For example, the dataset 152 is an underlying table of rows and columns of the application 190 and each data record 154 is a row or portion of a row of the table. Rows and columns of a table are merely exemplary and the dataset 152 and data record may take the form of any appropriate data structure. Each data record 154 (e.g., each row of the table) may include any number of elements (e.g., each cell of the row). Each element may include different data types, such as text, images, or audio data. For example, a dataset 152 may track orders in a table, and each data record 154 (i.e., each row of the table) includes a number of different elements associated with the respective order. One element may include a date the order was placed, another element may include an address where the order was delivered, while yet another element may include a photograph of the delivered location. The application 190, based on, for example, the trigger conditions, views and/or modifies the underlying dataset 152. Using the previous example, the application 190 may use trigger conditions to generate an email every time one of the data records 154 indicates that an order has been delivered (e.g., when an element in the data record 154 associated with delivery changes status to indicate the delivery is complete).

In response to the request 30, the application controller 150 renders, within the host container 184, an embedded application view 210, 210E. More specifically, the application controller 150 causes the host container 184 to render, using the GUI 14b, the embedded application view 220E such that the user 12b views the embedded application view 220E.

Figure 2A:
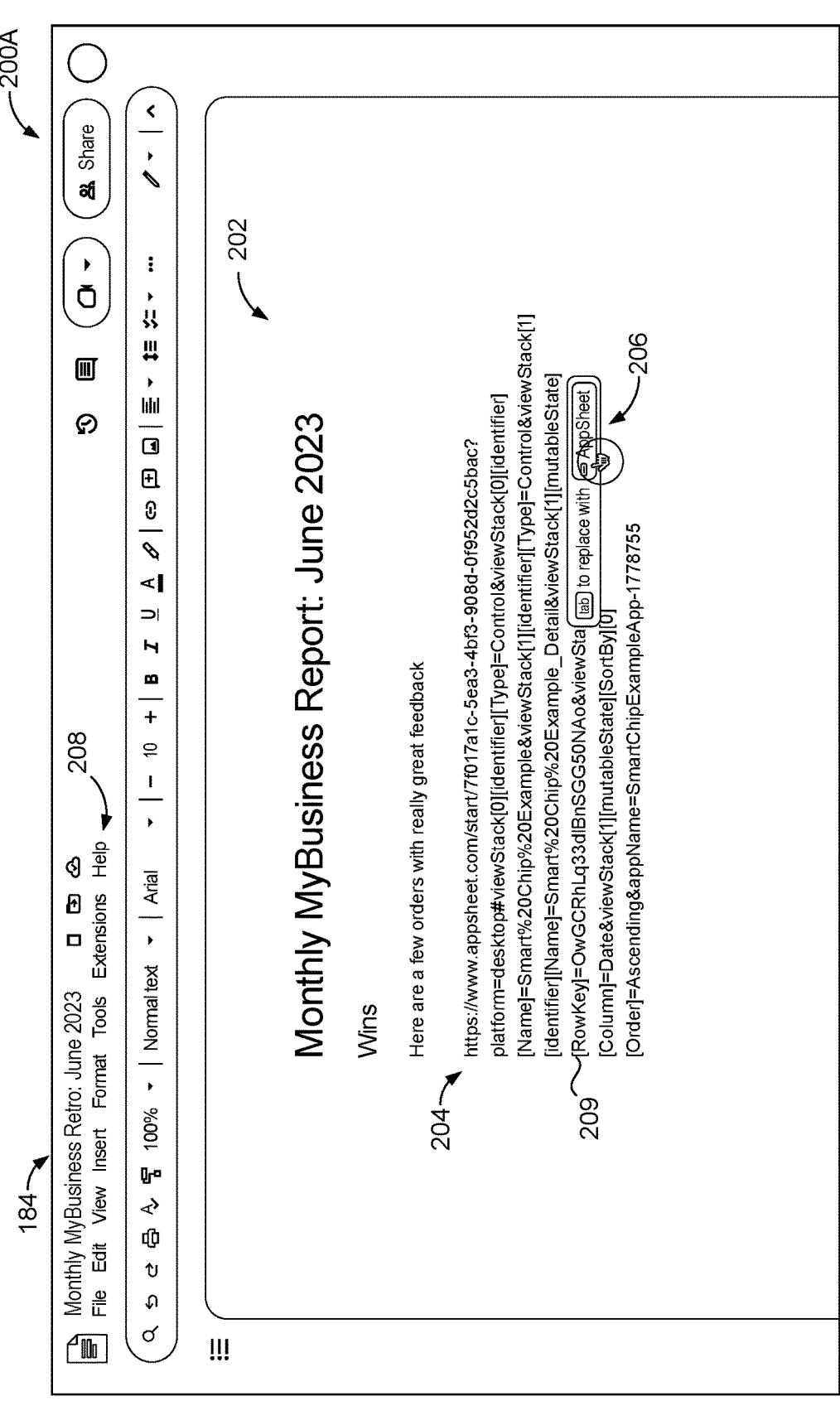
FIG. 2A is a schematic view of a uniform resource locator (URL) for an embedded application view.

Referring now to FIG. 2A, an exemplary GUI view 200A (e.g., displayed on the GUI 14b for viewing by the user 12b) displays a GUI of a host container 184. In this example, the host container 184 is a document editor that has a document titled "Monthly MyBusiness Retro: June 2023" open for viewing and/or editing. The host container 184 includes an editing area 202 that allows the user 12 to view and edit text, images, and other data. The request 30 may be generated in response to the URL 204 being entered into the editing area 202. The URL 204 references the dataset 152 and/or one or more data records 154 of the dataset 152. For example, the URL 204 includes a record identifier 209 that uniquely identifies one or more data records 154 of the dataset. The URL 204 may include any number of other identifiers that identify, for example, the application 190, the dataset 152, the user 12, the host container 184, etc.

In some examples, the user 12 provides the URL 204 via entry in the editing area 202 (e.g., via a copy and paste, manual typing, etc.). For example, the user 12 copies the URL of a webpage associated with the application 190 and pastes the copied URL 204 into the editing area 202. In other examples, the URL 204 is generated by the host container 184 and/or the application controller 150 in response to the user interacting with one or more menus 208 of the host container 184. That is, in some implementations, generating the URL 204 is based on a user interaction indication indicating interaction, via the GUI, with the host container 184. For example, the user 12 selects a menu option that opens additional dialog boxes or windows allowing the user to navigate to and select an appropriate data record 154 and/or dataset 152 from an appropriate application 190.

Once the host container 184 or the application controller 150 (via the host container 184) determines the URL 204 is present within the editing area 202 (e.g., by determining that the URL 204 is associated with the application 190 and/or the dataset 152), the GUI may display an application view confirmation 206. The host container 184 may render the application view confirmation 206 near or over the URL 204 and may provide instructions to the user 12 for generating/embedding an embedded application view 210E. In this example, the user may select the application view confirmation or actuate the "Tab" key of a keyboard, however any number of ways may be used to provide confirmation.

Figure 2B:
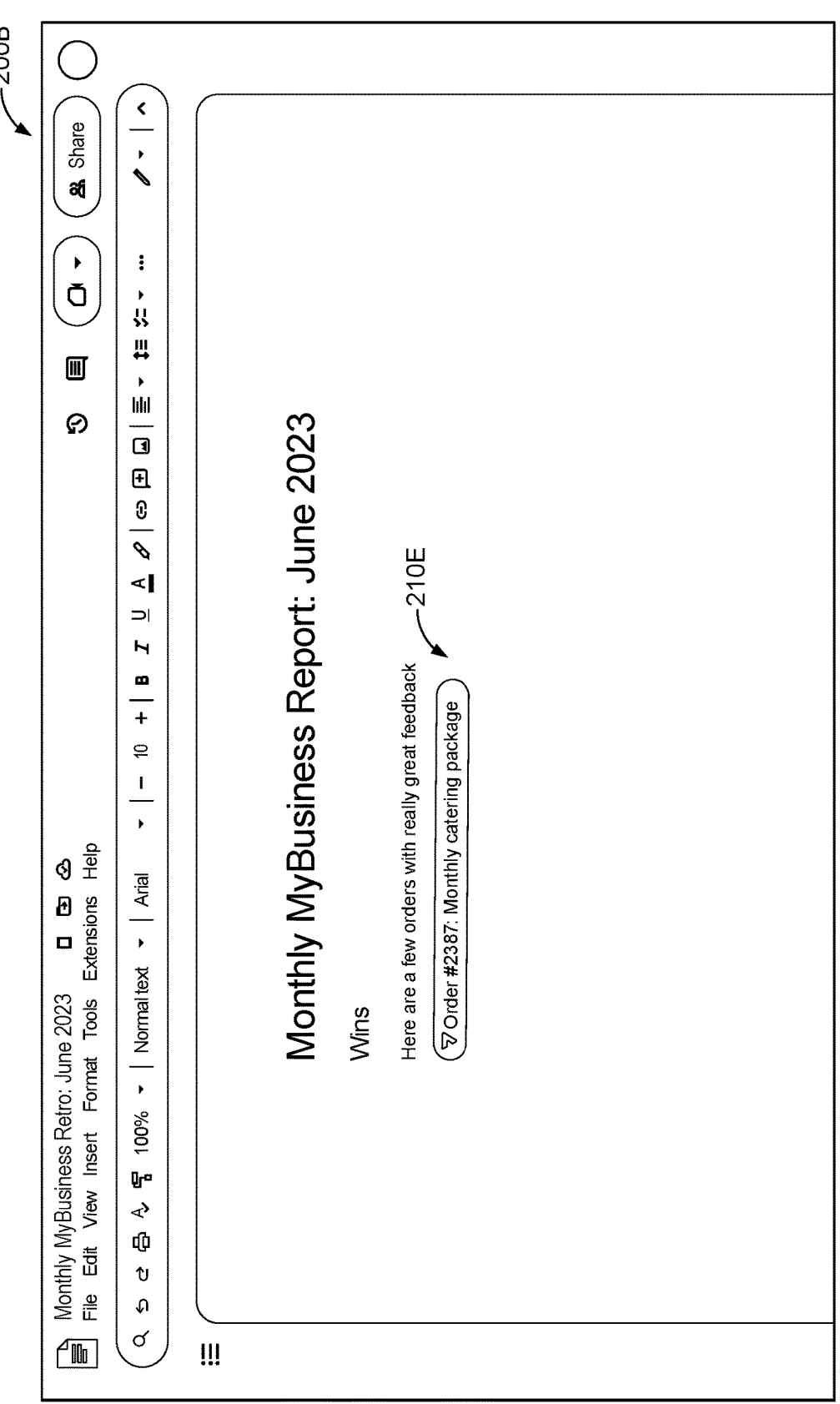
FIG. 2B is a schematic view of the embedded application view from the URL of FIG. 2A.

Referring now to FIG. 2B, an exemplary GUI view 200B illustrates that, when the user 12b interacts with the application view confirmation 206, the host container 184 and the application controller 150 replace the URL 204 with the embedded application view 210E. In this example, the URL 204 is fully replaced by the embedded application view 210E and is no longer visible to the user 12. The embedded application view 210E is based on the dataset 152 and/or one or more data records 154 of the dataset 152. In this example, the embedded application view 210E is associated with a single data record 154 of the dataset 152 (e.g., a single row of a table). The application controller 150 dynamically retrieves the data record 154 from the dataset 152 and renders the embedded application view 210E in accordance with the data record 154. Here, the data record 154 indicates an order number (i.e., Order #2387) and a description (i.e., "Monthly catering package). The embedded application view 210E may render any number of elements of the data record 154 (e.g., cells of the row). The embedded application view 210E may include only a subset of elements of the data record 154 (i.e., does not render every element of the data record 154 at the embedded application view 210E). The embedded application view 210E may be configured based on the URL 204 and/or configuration of the application 190.

Figure 2C:
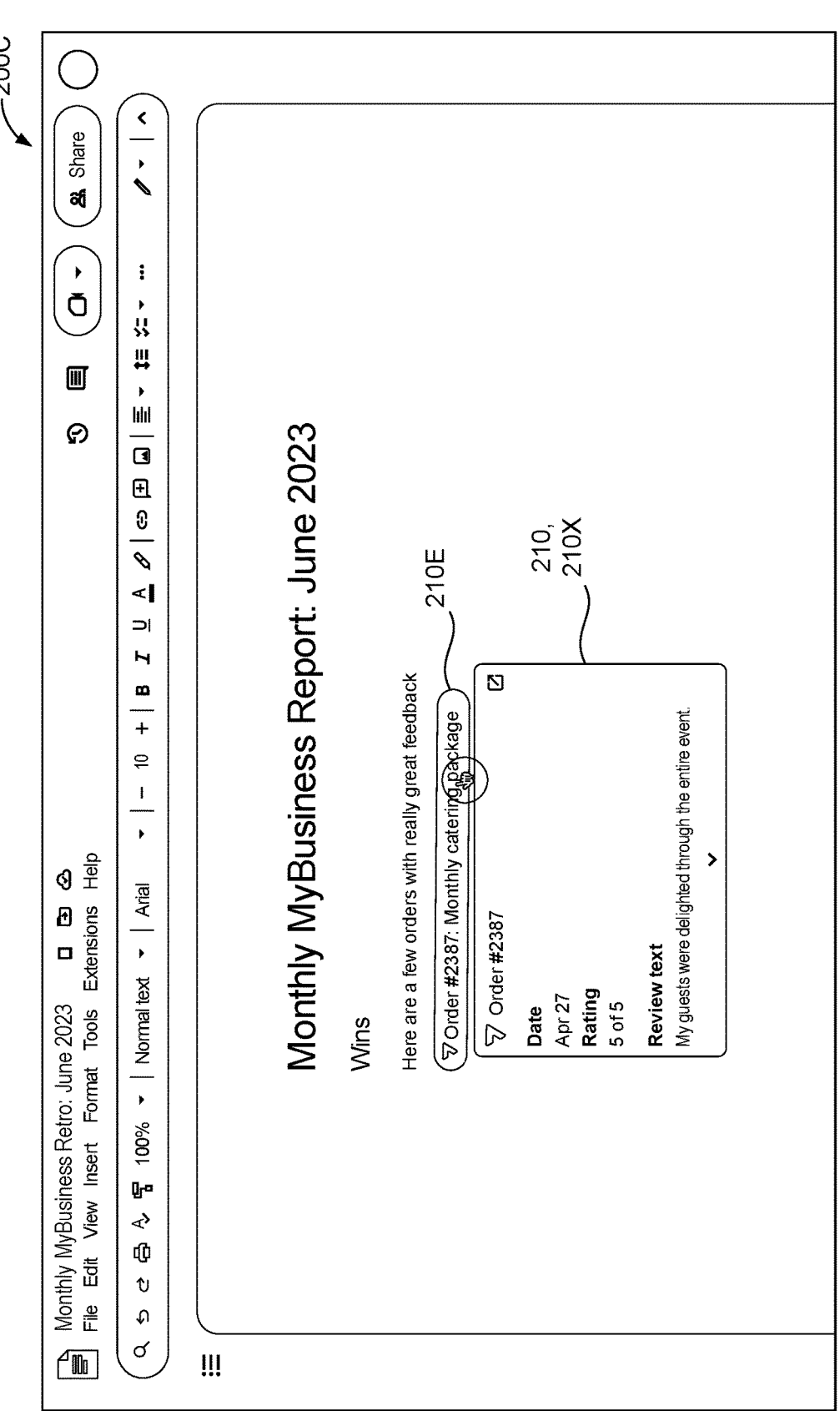
FIG. 2C is a schematic view of an expanded application view of the embedded application view of FIG. 2B.

Referring now to FIG. 2C, an exemplary GUI view 200C includes the embedded application view 210E from FIG. 2B. In some implementations, after embedding the application view 210E, the application controller 150 receives, from the user 12, a user interaction indication indicating interaction, via the GUI, with the embedded application view 210E. In this example, the user interaction indication includes the user 12 "hovering" a pointer over the embedded application view 210E. In other examples, the user interaction indication includes selecting the embedded application view 210E (e.g., via a keyboard, mouse, touch, etc.).

In response to receiving the user interaction indication, the application controller 150 retrieves, from the data store 148, the data record 154 of the dataset 152 associated with the embedded application view 210E. The application controller 150 and/or the host container 184 render an expanded application view 210, 210X at or near an anchor location established by the embedded application view 210E. The anchor location may be established by the position within the editing area 202 that the URL 204 is pasted or generated. The expanded application view 210X displays one or more additional elements of the retrieved data record 154 at the GUI. In this example, the user 12 interacts with the embedded application view 210E by hovering a mouse pointer over the embedded application view 210E. The application controller 150 and the host container 184 respond by rendering the expanded application view 210X as a floating "card" immediately below the embedded application view 210E. In other examples, the expanded application view 210X replaces the embedded application view 210E. Here, the expanded application view 210X displays additional elements of the data record 154 to the user 12. More specifically, the expanded application view 210X displays fields and values associated with a date, a rating, and review text.

The expanded application view 210X may display additional information associated with the data record 154 that is not rendered by the embedded application view 210E. The application controller 150 may retrieve some or all of the data record 154 dynamically and in real-time in response to the user interaction indication with the embedded application view 210E. Thus, the expanded application view 210X represents the "live" data of the dataset 152. The application controller 150 may update (i.e., re-retrieve the data record 154 to display the latest version of the data record 154 to the user 12) periodically (e.g., at regular intervals, such as once a second, once a minute, etc.) or in response to other triggers, such as a user interaction with the GUI. In some implementations, the application controller 150 updates the expanded application view 210X based on and updates to the underlying dataset 152 in response to the user selecting an update or "refresh" button. In other examples, the application controller 150 updates the expanded application view 210X whenever the user 12 interacts with the embedded application view 210E and/or the expanded application view 210X.

In some implementations, the application controller 150 receives, from the user 12, a second user interaction and, in response, the application controller 150 and/or the host container 184 stop rendering the expanded application view 210X and/or render the embedded application view 210E in place of the expanded application view 210X. For example, when the user 12 stops hovering the mouse pointer or cursor over the embedded application view 210E or the expanded application view 210X, the application controller 150 or host container 184 stops rendering the expanded application view 210X such that only the embedded application view 210E is visible to the user 12. In other examples, the user 12 closes the expanded application view 210X via selection of a button (e.g., an 'X' button or a "Close" button). When the user 12 chooses to re-render the expanded application view 210X (e.g., by again hovering over the embedded application view 210E), the application controller 150 may retrieve the latest elements of the data record 154 for the expanded application view 210X such that the expanded application view 210X reflects any updates to the data record 154. That is, the expanded application view 210X provides a dynamic and/or data-driven view that automatically updates based on changes to the underlying dataset 152.

Figure 3A:
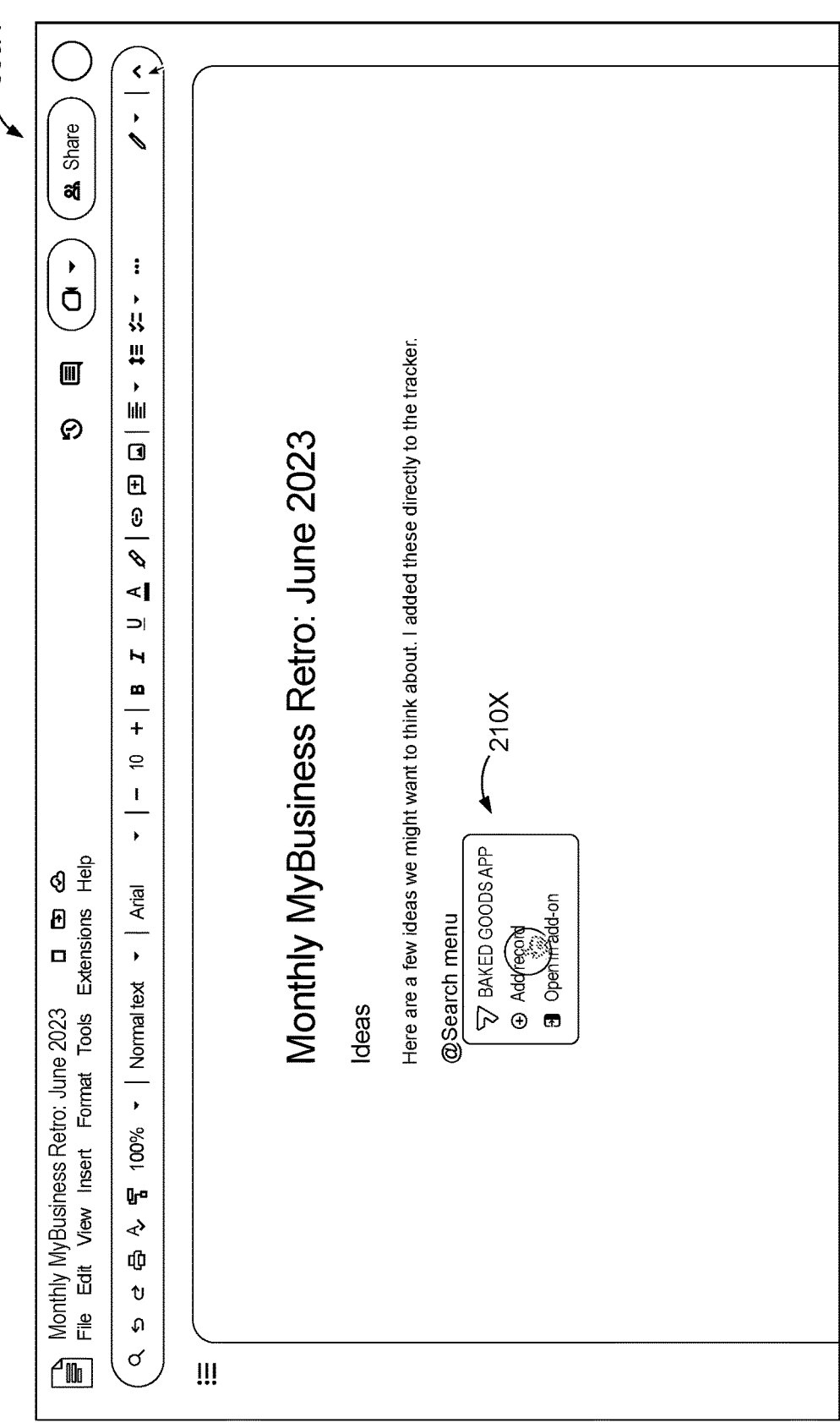
FIGS. 3A and 3B are schematic views of an expanded application view for modifying a data record of a dataset.
Figure 3B:
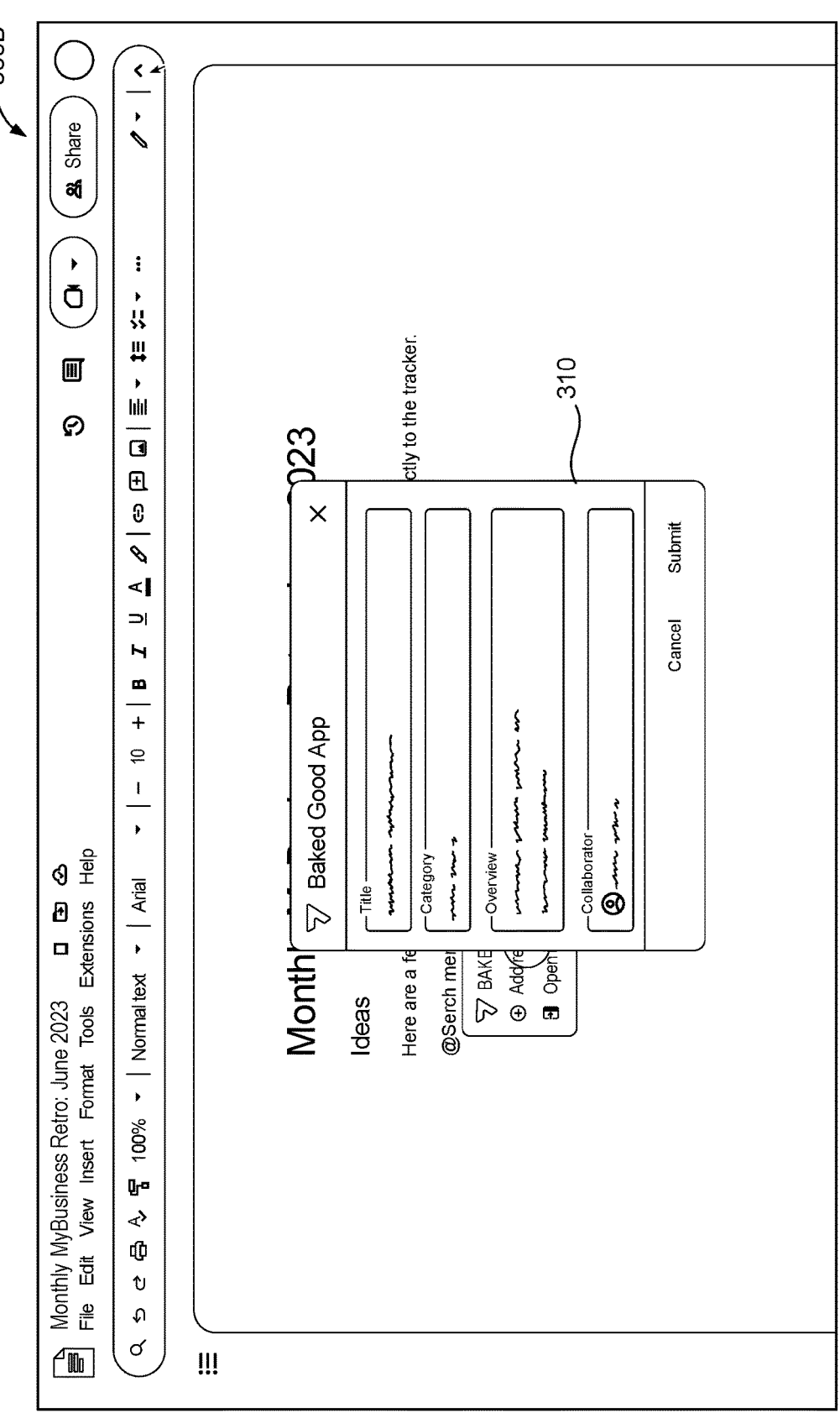

Referring now to FIG. 3A, an exemplary GUI view 300A includes another expanded application view 210X that provides the user 12 the option to add a data record 154 to the dataset 152. In this case, selection by the user 12 of the "Add record" option allows the user 12 to enter data into, for example, one or more text fields to provide data for a new data record 154 for the dataset 152. For example, as shown in an exemplary GUI view 300B of FIG. 3B, the application controller 150 and/or the host container 184 may render a data record modification view 310 that provides controls for the user 12 to add, modify, and/or delete data records 154. In response to receiving the data from the user 12 (e.g., text, images, etc.), the application controller 150 updates the dataset 152 at the data store 148 with the new data record 154. For example, the application controller 150 adds a new row to the table based on the information provided by the 12 vis the expanded application view 210X. One or more embedded application views 210E and/or expanded application view 210X rendered at one or more host containers 184 may dynamically update to reflect the new data record 154. In some examples, the application controller 150 receives, from the user 12, a second user interaction indication indicating interaction, via the GUI, with the expanded application view 210X and, based on the second user interaction indication, updates the data record 154 of the dataset 152 (i.e., changes one or more elements of the data record 154), adds a new data record 154 to the dataset 152, and/or deletes the data record 154 from the dataset 152. The application controller 150 and/or the host container 184 may update the expanded application view 210X and/or the embedded application view 210E based on the updated data record 154 of the dataset 152 or the new data record 154 of the dataset 152 or the deleted data record 154 of the dataset 152.

In addition to or alternative to modifying one or more data records 154 of the dataset 152, the expanded application view 210X may allow the user 12 to perform other actions. In some implementations, the application controller 150 receives, from the user 12, another user interaction indication indicating interaction, via the GUI, with the expanded application view 210X and, in response to receiving the user interaction indication, executes a script defined by the no-code application, sends an email, or sends a chat message. The script may be defined by the application 190 (i.e., configured by the author of the application 190) or may be independent from the application 190.

Figure 4A:
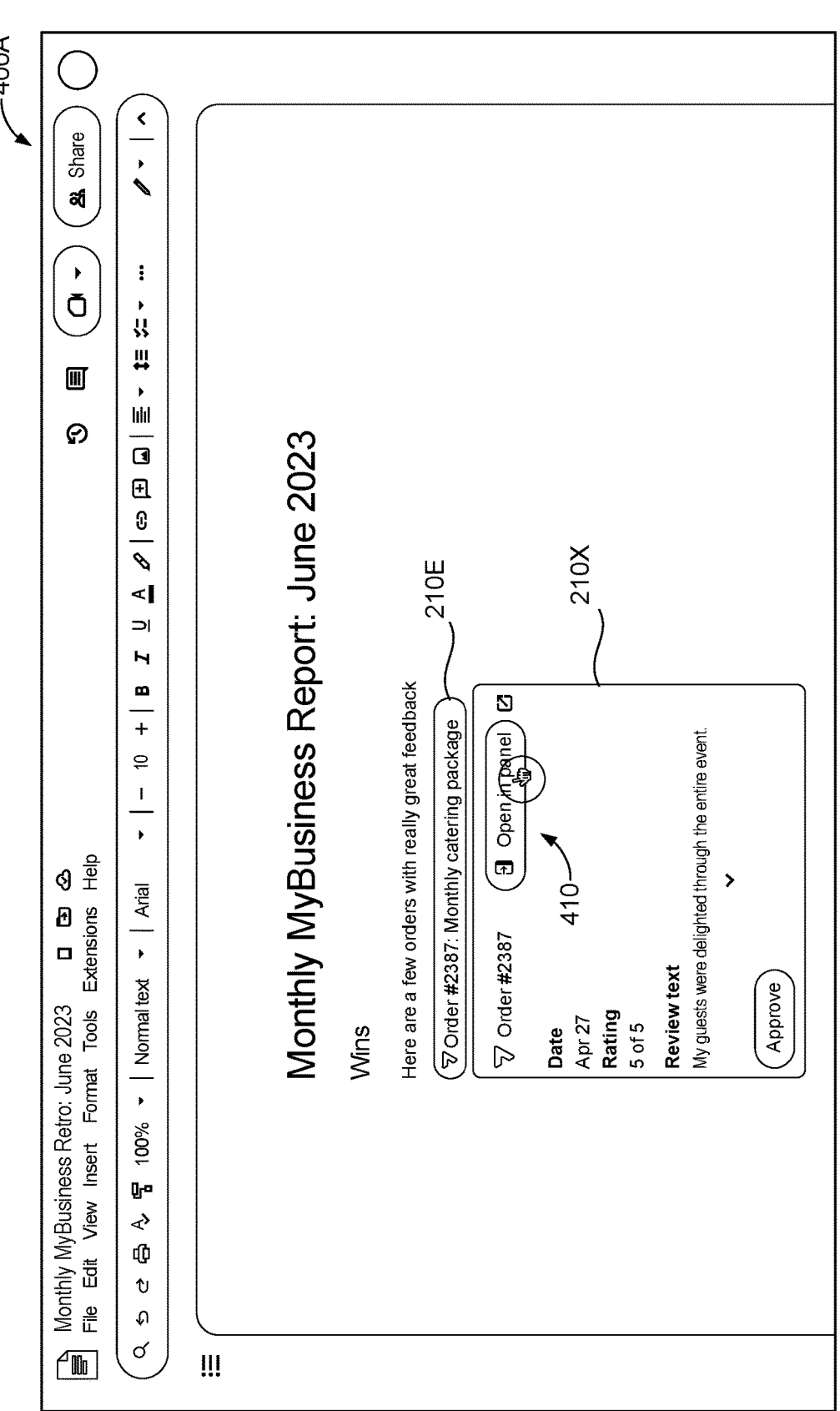
FIGS. 4A and 4B are schematic views of an expanded application view as an add-on panel.
Figure 4B:
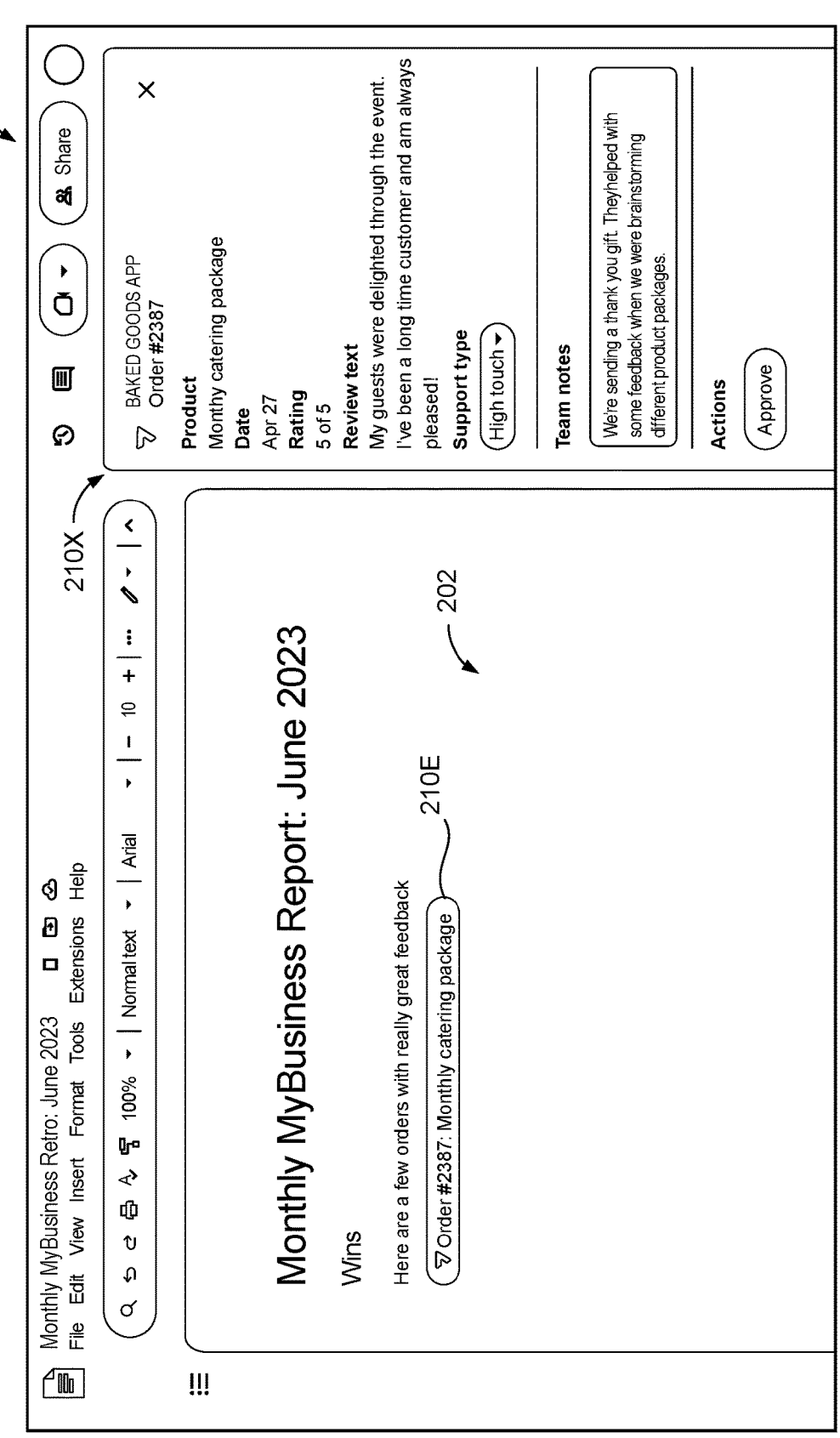

Referring now to FIG. 4A, an exemplary GUI view 400A includes an embedded application view 210E and an expanded application view 210X. In this example, the expanded application view 210X includes panel action 410. Actuation of the panel action 410 by the user results in the expanded application view 210X being rendered as an add-on panel, as illustrated in an exemplary GUI view 400B of FIG. 4B instead of the card view of FIG. 4A. As shown in FIG. 4B, the panel view allows for a greater expansion of the expanded application view 210X. In this example, the editing area 202 is resized in order to accommodate the expanded application view 210X. In some implementations, the expanded application view includes a full expanded application view that represents a user interface of the application 190. That is, in response to a user interaction, the application controller 150 and/or the host container 184 may render the expanded application view 210X in a manner that is the same or similar to a user interface of the application 190. The full expanded application view may be rendered as an add-on panel (as shown in FIG. 4B) or, in some examples, a full or maximized view that partially or completely blocks the view of the host container 184.

Referring back to FIG. 1, in some implementations, prior to rendering the embedded application view 210E, the application controller 150 obtains or retrieves (e.g., from the user 12) credentials 32 of the user 12 of the host container

184. For example, the application controller 150 receives the credentials 32 from the host container 184 or from the user 12 (via the request 30). The application controller 150 uses the credentials 32 to determine whether the user 12 has sufficient privilege or access to the data record(s) 154 and/or dataset 152 associated with the requested embedded application view 210E. For example, the application controller 150 determines whether the credentials 32 match a user 12 of an access control list or the like that are authorized to access the dataset 152 (e.g., by the author of the application 190 and/or an owner of the dataset 152).

When the application controller 150 determines that the user 12 is authorized to view (and, in some examples, edit) the data record 154 of the dataset 152, the application controller 150 continues with instructions to the host container 184 to render the embedded application view 210E. When the application controller 150 determines that the user 12 is not authorized to view and/or edit the data record of the dataset 152, the application controller 150, in some examples, declines to provide instructions to the host container 184 to render the embedded application view 210E and instead renders a warning message indicating the lack of credentials. In other examples, the application controller 150 instead instructs to the host container 184 to render the embedded application view 210E, and the embedded application view 210E displays the warning message instead of any portions of the data record 154. In some examples, the application controller 150 provides a prompt to allow the user 12 to request authorization to access the dataset and/or automatically requests (e.g., from the author of the application 190 or an owner of the dataset 152) authorization for the user 12. The application controller 150 may periodically or regularly determine that the user 12 is authorized to view the data record 154. For example, whenever the application controller 150 retrieves a data record 154 from the data store 148, the application controller 150 determines whether the credentials 32 authorize the user 12 to view or edit the corresponding data record 154.

While examples herein illustrate the embedded application view 210E and the expanded application view 210X rendering information related to a single data record 154 of the dataset 152, other examples include the embedded application view 210E and/or the expanded application view 210X instead rendering information associated with the dataset 152 instead of any particular data record 154 of the dataset 152. For example, the host container 184 receives (e.g., from the user 12b) or generates another URL 204 that references the application 190 and the dataset 152 without referencing a particular data record 154 of the dataset 152. In this example, the application controller 150 and the host container 184 may render a different embedded application view 210E and/or expanded application view 210X that allow the user 12 to browse, filter, and/or search all of the data records 154 of the dataset 152.

Thus, the system 100 and the application controller 150 enables the ability for users to execute "automations" (e.g., execute scripts, send messages, modify underlying data sources, etc.) and workflows from a single interaction within a view rendered in a convenient host container (e.g., a document editor) to reduce required context switching. The rendered view can rely on an application authored and deployed via a no-code application development environment, lowering the bar typically required to utilize such tools. The system allows both technical and non-technical users across different systems and environments to coexist, share data, and collaborate by providing users ways to view, manage, and distribute solutions that ease the burdens of cross-platform work.

Figure 5:
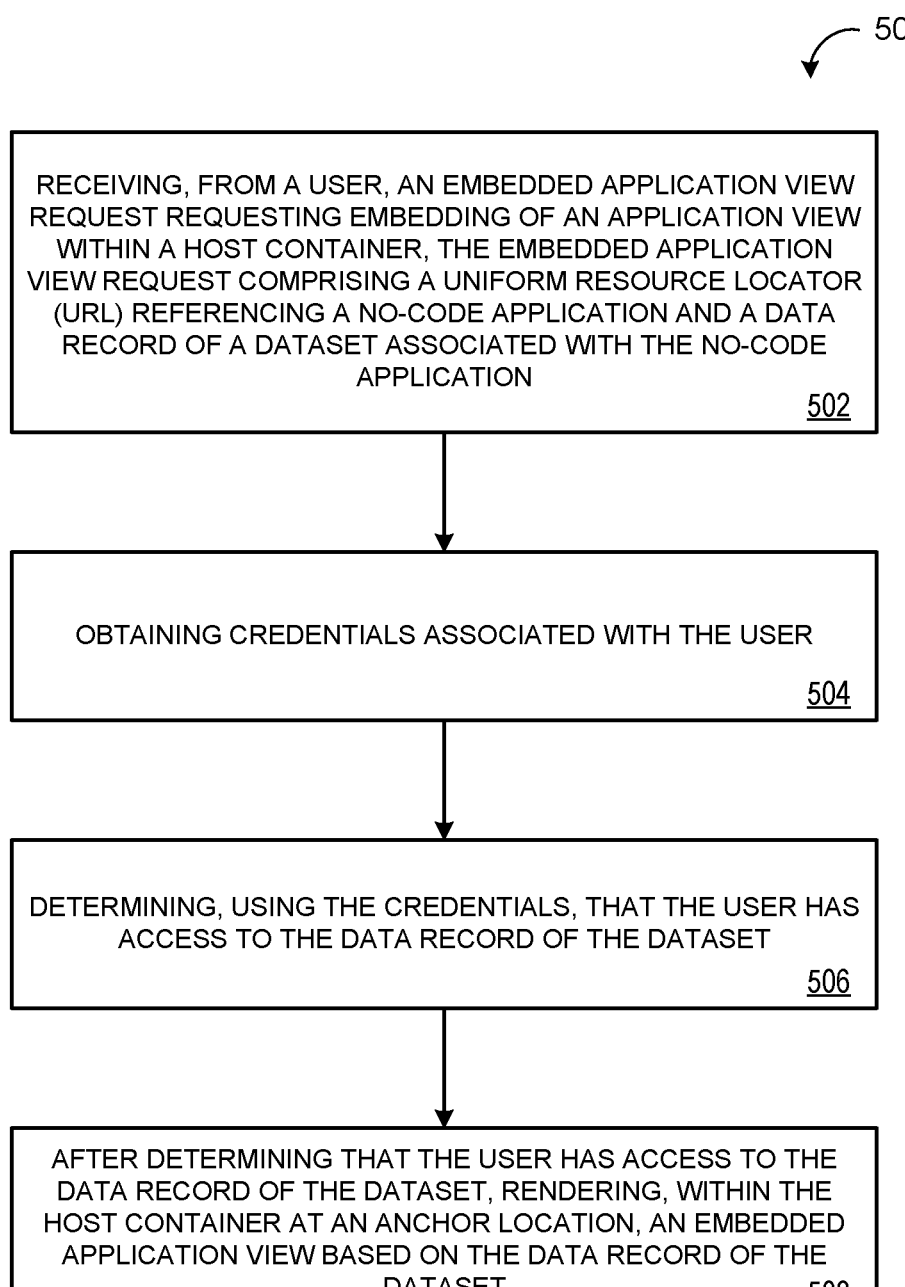
FIG. 5 is a flowchart of an example arrangement of operations for a method for automatic generation of no-code embedded data-driven application views.

FIG. 5 is a flowchart of an exemplary arrangement of operations for a method 500 for automatic generation of no-code embedded data-driven application views. The method 500, when executed by data processing hardware 144 causes the data processing hardware 144 to perform operations. The method 500, at operation 502, includes receiving, from a user 12, an embedded application view request 30 requesting embedding of an application view 210 within a host container 184. The application view 210 is derived from a no-code application 190, and the no-code application 190 is generated using a no-code application development environment. The embedded application view request 30 includes a URL 204 referencing the no-code application 190 and a data record 154 of a dataset 152 associated with the no-code application 190. At operation 504, the method 500 includes obtaining credentials 32 associated with the user 12. At operation 506, the method 500 includes determining, using the credentials 32, that the user 12 has access to the data record 154 of the dataset 152. The method 500, at operation 508, includes, after determining that the user 12 has access to the data record 154 of the dataset 152, rendering, within the host container 184 at an anchor location, an embedded application view 210E based on the data record 154 of the dataset 152.

Figure 6:
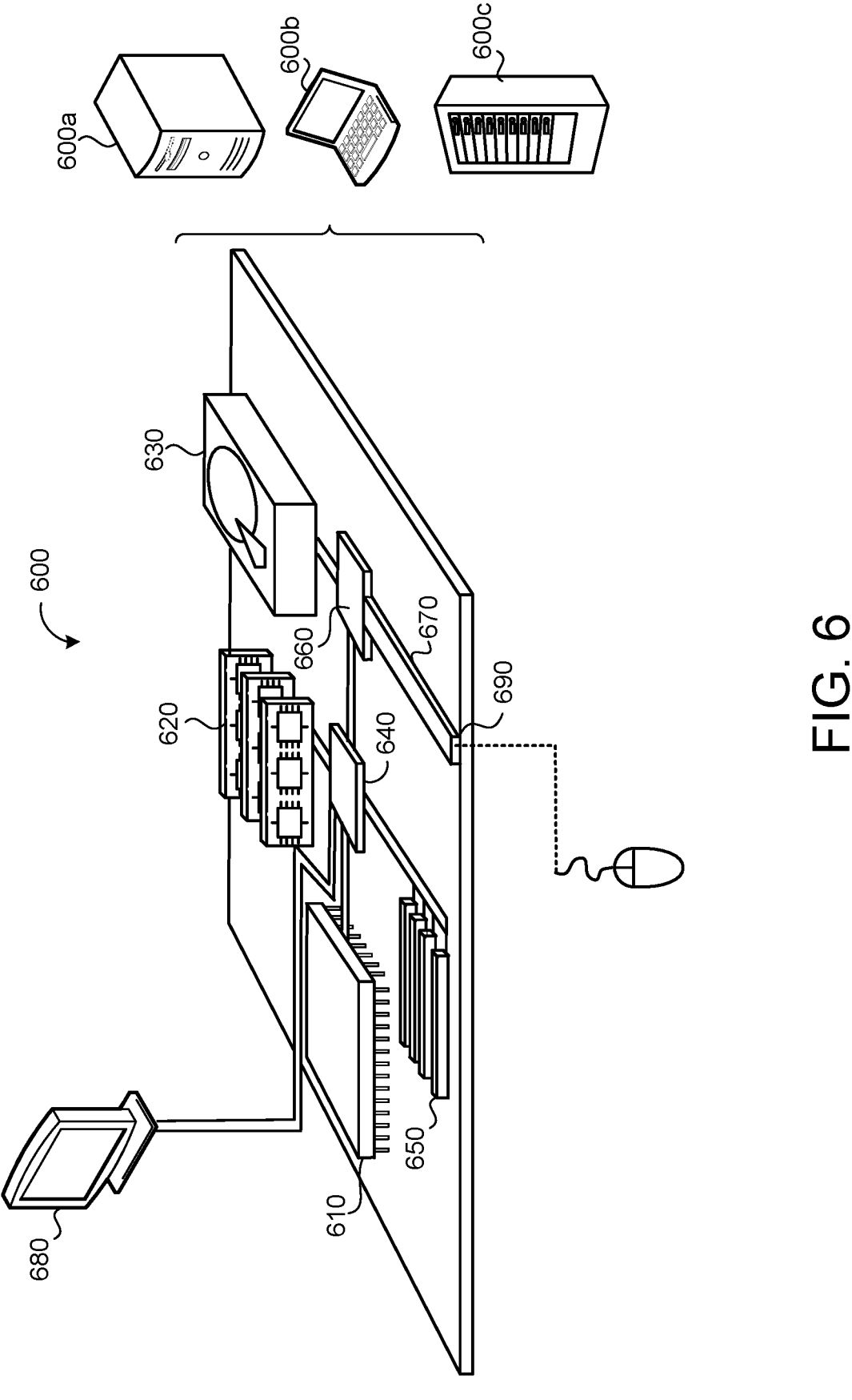
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:

receiving, by data processing hardware and from a user, an interactive application view request requesting to embed an interactive application view within a document editor, wherein the interactive application view request includes a uniform resource locator referencing a no-code application and a data record of a dataset, wherein the dataset includes data accessed by the no-code application, and wherein the no-code application is generated using a no-code application development environment;

generating, by the data processing hardware, the interactive application view, wherein the interactive application view is derived from the no-code application and the interactive application view is configured to update in response to changes in the data record of the dataset;

obtaining, by the data processing hardware, credentials associated with the user;

determining, by the data processing hardware and using the credentials, that the user has access to the data record of the dataset; and responsive to determining that the user has access to the data record of the dataset, rendering, by the data processing hardware and within the document editor at an anchor location, the interactive application view, wherein the anchor location is established by a position in the document editor including the uniform resource locator and the interactive application view is based on the data record of the dataset.

2. The method of claim 1, further comprising:

after rendering the interactive application view, receiving, by the data processing hardware and from the user, a user interaction indication indicating interaction, via a graphical user interface, with the interactive application view; and after receiving the user interaction indication:

retrieving, by the data processing hardware, the data record of the dataset; and rendering, by the data processing hardware, an expanded application view at the anchor location in place of the interactive application view, the expanded application view displaying the data record at the graphical user interface.

3. The method of claim 2, further comprising:

receiving, by the data processing hardware and from the user, a second user interaction indication indicating interaction, via the graphical user interface, with the expanded application view; and based on the second user interaction indication:

updating, by the data processing hardware, the data record of the dataset; or adding, by the data processing hardware, a new data record to the dataset.

4. The method of claim 3, further comprising updating, by the data processing hardware, the expanded application view based on the updated data record of the dataset or the new data record of the dataset.

5. The method of claim 2, further comprising:

receiving, by the data processing hardware and from the user, a second user interaction indication indicating interaction, via the graphical user interface, with the expanded application view; and after receiving the second user interaction indication:

executing, by the data processing hardware, a script defined by the no-code application;

sending, by the data processing hardware, an email; or sending, by the data processing hardware, a chat message.

6. The method of claim 2, further comprising:

receiving, by the data processing hardware and from the user, a second user interaction indication; and after receiving the second user interaction indication, rendering, by the data processing hardware, the interactive application view in place of the expanded application view.

7. The method of claim 1, further comprising:

receiving, by the data processing hardware and from a second user, a second interactive application view request requesting embedding of the interactive application view within the document editor;

obtaining, by the data processing hardware, second credentials associated with the second user;

determining, by the data processing hardware and using the second credentials, that the second user does not have access to the data record of the dataset; and after determining that the second user does not have access to the data record of the dataset, rendering, by the data processing hardware and within the document editor at a second anchor location, a second interactive application view indicating that the second user does not have access to the data record of the dataset.

8. The method of claim 1, further comprising, prior to receiving the interactive application view request, generating, by the data processing hardware, the uniform resource locator based on a user interaction indication indicating interaction, via a graphical user interface, with the document editor.

9. The method of claim 1, further comprising:

receiving, by the data processing hardware and from a second user, a second interactive application view request requesting embedding of the interactive application view within the document editor, the second interactive application view request comprising a second uniform resource locator referencing the no-code application and the dataset; and rendering, by the data processing hardware and within the document editor at a second anchor location, a second interactive application view based on the dataset.

10. A computing system comprising:

data processing hardware; and memory hardware in communication with the data processing hardware, the memory hardware storing instructions that when executed on the data processing hardware cause the data processing hardware to:

receive, from a user, an interactive application view request requesting to embed an interactive application view within a document editor, wherein the interactive application view request includes a uniform resource locator referencing a no-code application and a data record of a dataset, wherein the dataset includes data accessed by the no-code application, wherein the no-code application is generated using a no-code application development environment;

generate the interactive application view, wherein the interactive application view is derived from the no-code application and the interactive application view is configured to update in response to changes in the data record of the dataset;

obtain credentials associated with the user;

determine, using the credentials, that the user has access to the data record of the dataset; and responsive to determining that the user has access to the data record of the dataset, render, within the document editor at an anchor location, the interactive application view, wherein the anchor location is established by a position in the document editor including the uniform resource locator and the interactive application view is based on the data record of the dataset.

11. The computing system of claim 10, wherein the instructions further cause the data processing hardware to:

after rendering the interactive application view, receive, from the user, a user interaction indication indicating interaction, via a graphical user interface, with the interactive application view; and after receiving the user interaction indication:

retrieve the data record of the dataset; and render an expanded application view at the anchor location in place of the interactive application view, the expanded application view displaying the data record at the graphical user interface.

12. The computing system of claim 11, wherein the instructions further cause the data processing hardware to:

receive, from the user, a second user interaction indication indicating interaction, via the graphical user interface, with the expanded application view; and based on the second user interaction indication:

update the data record of the dataset; or add a new data record to the dataset.

13. The computing system of claim 12, wherein the instructions further cause the data processing hardware to update the expanded application view based on the updated data record of the dataset or the new data record of the dataset.

14. The computing system of claim 11, wherein the instructions further cause the data processing hardware to:

receive, from the user, a second user interaction indication indicating interaction, via the graphical user interface, with the expanded application view; and after receiving the second user interaction indication:

execute a script defined by the no-code application;

send an email; or send a chat message.

15. The computing system of claim 11, wherein the instructions further cause the data processing hardware to:

receive, from the user, a second user interaction indication; and after receiving the second user interaction indication, render the interactive application view in place of the expanded application view.

16. The computing system of claim 10, wherein the instructions further cause the data processing hardware to:

receive, from a second user, a second interactive application view request requesting embedding of the interactive application view within the document editor;

obtain second credentials associated with the second user;

determine, using the second credentials, that the second user does not have access to the data record of the dataset; and after determining that the second user does not have access to the data record of the dataset, render, within the document editor at a second anchor location, a second interactive application view indicating that the second user does not have access to the data record of the dataset.

17. The computing system of claim 10, wherein the instructions further cause the data processing hardware to, prior to receiving the interactive application view request, generate the uniform resource locator based on a user interaction indication indicating interaction, via a graphical user interface, with the document editor.

18. The computing system of claim 10, wherein the instructions further cause the data processing hardware to:

receive, from a second user, a second interactive application view request requesting embedding of the interactive application view within the document editor, the second interactive application view request comprising a second uniform resource locator referencing the no-code application and the dataset; and render, within the document editor at a second anchor location, a second interactive application view based on the dataset.

\* \* \* \* \*